Figure 1:
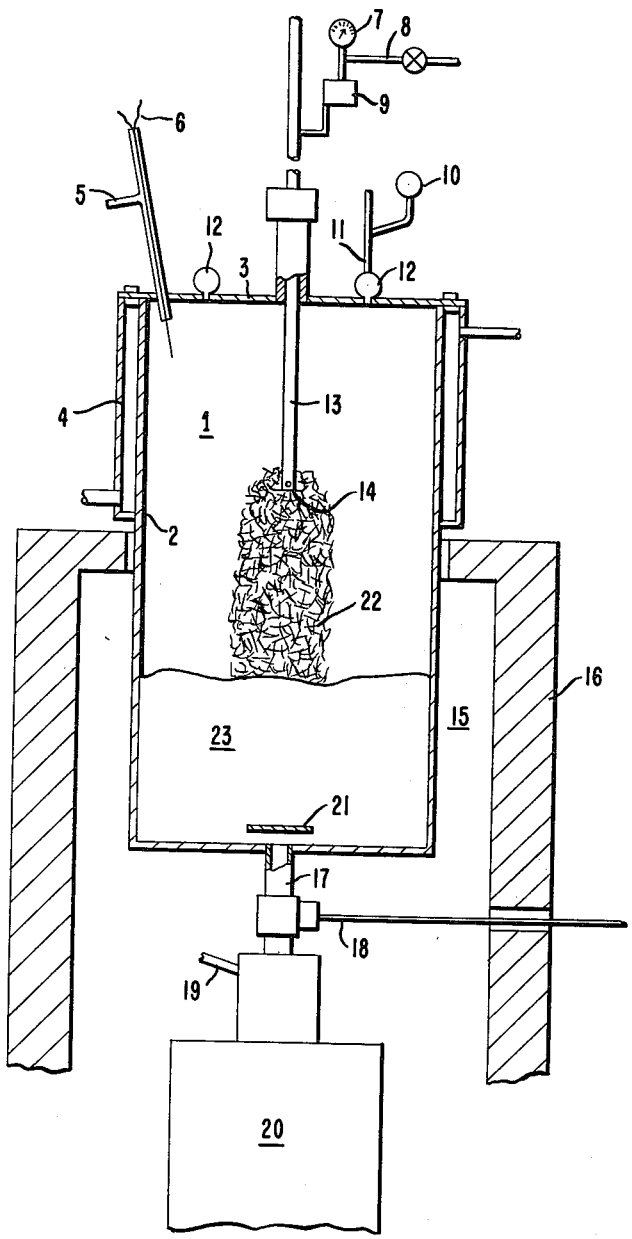

Jan. 29, 1963

A. R. CONKLIN ETAL 3,075,837

REDUCTION PROCESS FOR THE PREPARATION OF
REFRACTORY METAL SUBHALIDE COMPOSITIONS

Filed Nov. 24, 1958

2 Sheets-Sheet 1

INVENTORS
ALFRED R. CONKLIN
RICHARD M. LUCKRING

BY James R. Morrison

ATTORNEY

Jan. 29, 1963  A. R. CONKLIN ETAL  3,075,837
REDUCTION PROCESS FOR THE PREPARATION OF
REFRACTORY METAL SUBHALIDE COMPOSITIONS
Filed Nov. 24, 1958
2 Sheets-Sheet 2

INVENTORS
ALFRED R. CONKLIN
RICHARD M. LUCKRING

BY James R. Morrison

ATTORNEY

United States Patent Office 3,075,837
Patented Jan. 29, 1963

3,075,837
REDUCTION PROCESS FOR THE PREPARATION OF REFRACTORY METAL SUBHALIDE COMPOSITIONS
Alfred R. Conklin, Bear, and Richard M. Luckring, Wilmington, Del., assignors to E. I. du Pont de Nemours and Company, Wilmington, Del., a corporation of Delaware
Filed Nov. 24, 1958, Ser. No. 776,100
7 Claims. (Cl. 75—84.5)

This invention relates to a process for the partial reduction of certain refractory metal halides. More specifically, it concerns an improved method for the reduction of the higher valent chlorides of refractory metals, such as titanium tetrachloride, to a lower valent metal halide-salt mixture, for example sodium chloro-titanite.

The modern metallurgy of the more refractory metals usually involves the preparation and purification of a higher halide of the metal followed by reduction of this halide with a powerful agent such as an alkali or alkaline earth metal. Specific examples of this are the reduction of titanium tetrachloride with magnesium as taught by Kroll in U.S. Patent 2,205,854 and the sodium reduction of this chloride in accordance with the well konwn bomb technique of Hunter. The reduction reactions are very exothermic. The evolved heat is so great that production rates are limited by the practical means of conducting this heat away from the reaction zone.

Because of the heat problem connected with the total reduction of these metal halides it is desirable to accomplish the reduction in a stepwise manner thereby permitting greater heat removing capacity. The partial reduction of TiCl$_4$, for example, to the simple lower chlorides such as TiCl$_2$ and TiCl$_3$ is possible but, since these compounds are high melting solids and easily contaminated by contact with air, the commercial handling of them is very difficult. These lower chlorides do, however, dissolve in other salts such as the alkalinous halides, especially sodium chloride, to form low melting salt compositions, some of which melt as low as 550° C. and can be handled as liquids in iron equipment. These compositions result from the partial reduction of TiCl$_4$ with sodium metal, the two chief chemical reactions being:

(1) 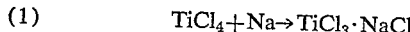
$$TiCl_4 + Na \rightarrow TiCl_3 \cdot NaCl$$

(2) 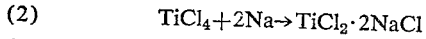
$$TiCl_4 + 2Na \rightarrow TiCl_2 \cdot 2NaCl$$

One or both of these reactions may occur so that the lower titanium chloride-salt composition resulting may be considered to be a sodium chlorotitanite of empirical formulas NaTiCl$_4$ and Na$_2$TiCl$_4$ and mixtures thereof. Additional carrier salts may also be present. These products, therefore, contain titanium in lower valent forms wherein the average valence is not greater than three nor less than two. For reasons of obtaining high purity and for more equally splitting the evolved heat, it is preferred to carry the reduction to the divalent titanium state or nearly so. Sodium will accomplish the reduction easily, economically and rapidly insofar as its cost, reducing power and ease of handling are concerned. However, under known conditions of practical commercial production, as one nears the half way point of divalent titanium, the formation of titanium metal presents problems. For example the sodium inlet is promptly plugged with metal which terminates the process. This metal plug can sometimes be avoided by operating at rates too slow for commercial needs. Also, undesirable accumulations of titanium metal tend to form on the reactor walls which choke up the reactor.

An object of this invention is, therefore, to provide a practical process for the partial reduction of refractory metal halides especially chlorides of the refractory metals of periodic groups IV, V, and VI. A further object is to produce the resulting lower chloride product in fluid or molten form so that it may be readily transferred to other locations for subsequent use, such as further reduction to the metal. Still another object is to establish conditions and means whereby this process may be operated at commercially feasible rates without shutdowns due to plugging and choking of the reactor.

These and other objects and advantages are realized by this invention which broadly comprises introducing a fluid alkalinous reducing metal through a porous metal body preferably formed of the metal undergoing partial reduction, into reactive contact with a higher halide of the refractory metal to be reduced in fluid form which is maintained adjacent to and preferably nearly surrounding the porous metal body contained in a reaction chamber free of contaminating impurities. The fluid higher valent refractory metal halide and the fluid alkalinous reducing metal are simultaneously fed into the reaction chamber in average relative amounts such that the alkalinous reducing metal is provided in quantities sufficient to react with a part of the halide atoms present in the refractory metal halide to reduce the valence of the refractory metal to a value not less than two, and the resulting product, comprising a mixture of a halide of the alkalinous reducing metal and a lower halide of the refractory metal, are removed from the reaction. During the reduction reaction the size of the porous refractory metal body, through which the alkalinous reducing metal is introduced, is controlled and it is maintained in a porous condition by subjecting it to the corrosive action of the higher valent refractory metal halides.

The process is preferably carried out in a continuous or semicontinuous manner. Essential requirements for this include the continuous non-plugging introduction of the reducing metal, the constant provision of the refractory metal halide fluid in the reaction chamber, and temperature control of the reaction chamber to keep the product in the molten state for easy withdrawal. In such continuous procedures a reaction chamber is provided with a reducing metal inlet or inlets. A porous mass of the metal being reduced is formed across the reducing metal inlet and the refractory metal halide fluid is supplied to the reaction chamber. Initially the chamber is warmed to start the reaction as the reducing metal is introduced but, as the reaction gains in speed, cooling may be employed. Since the porous metal body is uniquely related to the reaction, with which it is closely associated, and as is hereinafter described, it bears a size relationship to the reaction rate or the rate of reducing metal introduction. The porous body has a tendency to grow in size with high reducing metal input rates due to the local deposition of new refractory metal upon it. For continuous operation in a given chamber, the size of this porous body must be controlled so that it does not present a barrier to the introduction of fluid reducing metal and yet presents a usefully large surface area to the refractory metal halide fluid without contact with the chamber walls except at the necessary points of support and around the fluid reducing metal inlet. This control of the porous body is maintained by the dissolving action of the higher valent refractory metal halides present, either by impinging the higher valent refractory metal halides directly onto the porous mass or by soaking the porous mass in a molten salt bath containing the higher valent halides.

This invention is applicable to the partial reduction of the vaporizable halides, preferably those boiling or subliming at the normal pressure of one atmosphere at a temperature below about 500° C., of several refractory metals but most suitably those of periodic groups IV, V, and VI, particularly titanium, zirconium, hafnium, vanadium, niobium, tantalum, molybdenum and tungsten. Because of the variety of valence states and different temperature characteristic it will be most convenient to give a detailed description of the process as it is applied to the partial reduction of titanium tetrachloride with sodium.

In the drawings are shown apparatus suitable for carrying out the process. In FIGURE 1 a reaction chamber 1 is provided within the cylindrical iron reaction vessel 2 having a bolted on cover 3. The lower section of the vessel is set into an enclosure 15 within the furnace structure 16. The space 15 is provided with usual heating means, not shown, with which one may regulate the temperature of space 15 in the range from room temperature to about 900–1000° C. The upper portion of the vessel is surrounded by jacket 4 for cooling with air, water or other fluids if desired. The cover also may be cooled, most conveniently by air blasts. The furnacing space 15 is also preferably supplied with air cooling means for use in controlling temperatures and removing heat of reaction. The reaction vessel 2 is fitted with a bottom drain pipe 17 and associated baffle 21 to prevent entrance of particles of metal into hot valve 18. The salt product is collected in a vessel 20 purged with inert gas through 19. The reaction vessel cover 3 is provided with purge gas inlets 5 and 8, and a retractable thermocouple probe 6. Inlet 11 supplies the titanium tetrachloride at a predetermined maximum pressure shown at gauge 10 to the circular distribution pipe 12 made integral with the cover and having perforations on the bottom which also penetrate the cover proper. The inlet pipe 13 is for introduction of sodium. It is capable of being raised and lowered by means of a sliding gland in the cover and suitable mounting mechanism not shown. A pressure indicator 7 for the sodium is mounted on the surge chamber 9. The lower end of pipe 13 carries a cup-like capping member 14 and lateral perforations. Additional perforations permitting the passage of a portion of the sodium may also be placed in the bottom of the capping member 14. The porous titanium metal body is formed at 22 around the sodium inlet and the salt product accumulates in the reaction vessel at 23.

Figure 2:
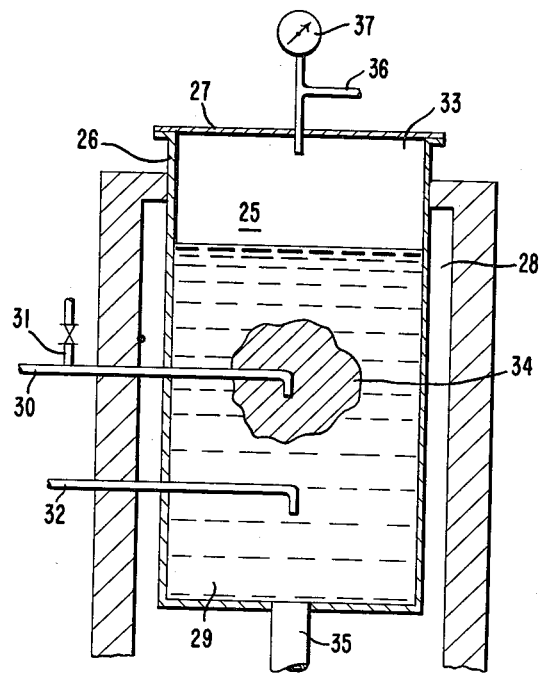

A modification of the apparatus of FIGURE 1 is presented in FIGURE 2 in which a reaction chamber 25 is provided within a cylindrical vessel 26 of mild steel or other thermal and corrosion resistant metals having a bolted on cover 27. The vessel is set into an enclosure 28 which may serve as furnacing means or as a passage for cooling liquids. A molten salt pool 29 is maintained in the reactor during the production operation. An inlet 30 for the introduction of fluid reducing metal enters the reactor and terminates in the molten salt pool 29. The inlet 30 is provided with a connecting line 31 for the admission of inert gas during the initial feeding period. An inlet 32 for the introduction of fluid titanium tetrachloride enters the reactor below the sodium inlet 30 and terminates in the molten salt pool 29. However, this titanium tetrachloride inlet may be above the fluid reducing metal inlet immersed in the salt, or it may terminate in a vapor space 33 maintained over the molten pool. An inert gas inlet 36 having a pressure gauge 37 to observe the pressure within the reactor is positioned at the top of vessel 26 for the introduction of inert gas into vapor space 33. A porous body of titanium 34 is maintained around the reducing metal inlet 30 and within the molten salt pool 29. An outlet 35 for the withdrawal of molten salt is provided at the bottom of vessel 26; however, depending on the material desired, it may be positioned anywhere from the molten salt surface to the bottom of the vessel.

The following examples are presented to illustrate particular modes of operating the process it being understood that these examples are presented in illustration and not in limitation of the invention:

Example I

An apparatus similar to that shown in FIGURE 1 and constructed of 316 stainless steel was used. The reaction vessel was 25 inches in diameter and 65 inches high. The perforated ring 12 was 16 inches in diameter and the sodium inlet pipe 13 was made from ¼ inch I.D. stainless tubing. The vessel was half filled with solid sodium chlorotitanite of the approximate composition $$TiCl_{2.6} \cdot 1.4NaCl$$

previously made, the cover assembly mounted and the apparatus purged with argon. The sodium and TiCl$_4$ supply connections were made but the actual inlets 13 and 12 were retained full of argon during the prereaction heat up. The furnace heat was then turned on and the contents of the vessel melted and raised to about 700° C. A slow flow of argon was maintained into the sodium inlet through 8. With these conditions existing TiCl$_4$ was admitted through 12 at an average rate of about 620 lbs./hr. and sodium at 140° C. was fed in through 13 at about 99 lbs./hr. The average pressure at gauge 8 was about 2 p.s.i. while brief maximum pressure reached 20 p.s.i. An autogenous temperature rise occurred indicating the start of the reaction. The molten salt composition was then valved out at the bottom into a series of drums 20. By weighing these drums the rate of salt tapping was controlled at the total input rate of 620+99 or 719 lbs./hr. thus maintaining a fairly constant salt level in the reaction vessel. The temperature of the salt body 23 was maintained at about 800° C. by moderating the furnace temperature and using some cooling air. Air cooling was employed to keep the cover between 150 and 200° C. This cover temperature served to protect the sliding seal around pipe 13 and to cause at least the major portion of the TiCl$_4$ to enter the reaction vessel in the liquid state, the cooling air jets being directed onto the distributor 12. After operating 26 hours about 19,000 lbs. of sodium chlorotitanite were produced. The process was terminated by stopping the sodium feed pump and admitting argon through 8 to clear tube 13 of sodium and then shutting off the TiCl$_4$ feed and cooling the equipment. The average composition of this product was TiCl$_{2.66} \cdot$ 1.34 NaCl. During the reaction a large accumulation of porous titanium sponge was formed around the end of pipe 13. It was about 16 inches in maximum diameter, and about 35 inches long. Its lower extremity was terminated at about the operating level of the salt 21. This titanium sponge was maintained in a porous condition and its size controlled to about 16 inches in diameter by the corroding action of the TiCl$_4$ as it dropped from the distributor.

Example II

With the porous titanium body formed in the first experiment still in place, the process of Example I was repeated but with the sodium rate set at 132 lbs./hr. and the TiCl$_4$ feed rate at 925 lbs./hr. The temperature of the molten salt in the reaction vessel was kept between 700 and 800° C. After running 6 hours the recovered product analyzed to indicate the composition TiCl$_{2.8} \cdot$ 1.2 NaCl and the porous titanium body had diminished somewhat in size.

Example III

An apparatus similar to that shown in FIGURE 1, in that it had the same general characteristics and accessories, but constituted of plain steel, was used. The sodium feed pipe 13, however, was a plain ¼ inch steel pipe turned up 180° at the end to form a J. A wad of clean titanium wool was secured over the opening with titanium wire to form the initial porous titanium body through which the sodium enters the reaction zone. The apparatus was argon purged and heated to 800° C. with slow argon flow through the sodium inlet. Sodium and titanium tetrachloride were then admitted simultaneously at the respective rates of 230 lbs./hr. and 950 lbs./hr. or very slightly less than two atoms of sodium for each mol of the chloride. As the reaction began in the porous body, its surface temperature rose rapidly to 880° C. as indicated by the thermocouple probe. At this point the sodium line pressure increased rather abruptly due presumably to the fact that the sodium was vaporizing within the pores of the titanium body and resistance to mass flow was accordingly increased. As the reaction continued the reaction zone temperature at the porous body surface increased to 900–1300° C. range. Cooling water was circulated in jacket 4 and the furnace temperature moderated to keep the molten salt product at 23 at about 900° C. As the reaction continued, the product was discharged at 17 to maintain the salt levels always below the sodium inlet pipe 13. Intermittently, all the accumulated salt was withdrawn, the valve being closed when smoke from TiCl$_4$ appeared. The period of the discharge cycle was calculated on the feed rates so that discharge began when the salt level reached a point a few inches below pipe 13. From time to time the sodium inlet pressure became excessive, e.g. over 50 p.s.i. This was believed due to the plugging of pores in the titanium sponge. To alleviate this the sodium feed was cut off and replaced by argon which purged the sponge of sodium. The pipe 13 was then lowered to submerge the sponge in the salt. The TiCl$_4$ flow was reduced to the range of about 5 lbs./hr. or less. Furnace temperature was controlled to keep salt 23 at about 900° C. By intermittently stopping the argon flow at 8, the molten salt penetrated the surface ports of the sponge dissolving excess metal, opening the pores and reducing the size of the body. By noting the flow rate and argon pressure 7, the reopening of the pores could be observed. Periods of 10 minutes to an hour served to recondition the porous body and control its size so that it could be raised and the reaction resumed at the normal rate. About 10 hours of operation produced several drums of sodium chlorotitanite ranging in composition from TiCl$_{2.3}$·1.7NaCl to TiCl$_{2.05}$·1.95 NaCl.

*Example IV*

In an apparatus similar to that shown in FIGURE 2, a steel reactor 10 inches in diameter and 30 inches high was half-filled with a molten mixture of sodium chloride and titanium subchloride and heated to 750° C. Liquid sodium was added at a rate of ½-lb./min. through a central ½ inch steel pipe having a downward facing opening 6 inches above the reactor bottom and through which 5 c.f.h. of argon was already passing to keep out the molten salt. This addition was continued for 5 minutes to build up a titanium sponge of approximately 8 inches around the orifice. After 5 minutes the argon addition was discontinued and the addition of liquid TiCl$_4$ was begun through a second similar nozzle whose downward opening was 2 inches above the reactor bottom. As soon as the TiCl$_4$ flow was established at 3 lbs./min., the argon flow through this pipe was discontinued and only pure sodium and TiCl$_4$ were added during the remainder of the run. During the run, the outside temperature of the reactor was maintained at approximately 800° C., and the temperature of the salt in the center of the reactor rose to a maximum of 1000° C. The run was continued without interruption until the sodium and TiCl$_4$ supply available in their respective blowcases was exhausted.

At the end of the run, argon was added through the TiCl$_4$ line before shutting off the TiCl$_4$ flow in order to prevent the product salt from backing into the line and freezing there. No similar addition of argon to the sodium line was required in this instance since the titanium sponge at the orifice prevented back diffusion.

Throughout the run, the molten salt level was maintained above the titanium sponge in order to control its size and keep it porous. At the end of the run, there was no appreciable change in the size of the 8 inch titanium sponge and it was still porous such that additional runs totaling 12-hours operation were possible using this same sponge.

A typical reaction product sampled during the latter part of the run analyzed:

Ti—21.6%
Na—14.3% or about 1.4NaCl·TiCl$_{2.6}$
Cl$_2$—64.1%

*Example V*

A mild steel reactor 10 inches in diameter was fitted with a downward facing ½ inch pipe whose opening was 4 inches above the center of the reactor bottom, and a similar ¼ inch nozzle 4 inches higher. This reactor was charged with approximately 50 lbs. of sodium chloride-titanium subchloride mixture such as obtained in Example IV and subsequently heated to 700° C. to obtain a molten salt mixture while a 2–5 c.f.m. stream of argon was introduced through each of the nozzles to keep them clear of salt.

After the salt temperature reaches 700° C., liquid sodium was passed into the reactor via the lower nozzle while liquid TiCl$_4$ was added through the upper nozzle, the TiCl$_4$:sodium ratio being about 4:1. Five minutes after the start of the reaction, the argon flow was discontinued and reactor heaters were removed for the remainder of the run. An 8 inch titanium sponge was formed on the lower nozzle, and maintained immersed in the molten salt mixture throughout the run. After three hours of operation, 78 lbs. of TiCl$_4$ and 21 lbs. of sodium had been added to the vessel. The reactor was then drained and permitted to cool.

It was found that the 8 inch titanium sponge had not changed appreciably in size. The product analyzed:

Ti—20.5%
Na—18.9% or about 1.9NaCl·TiCl$_{2.1}$
Cl$_2$—60.6%

Similar operations made in the same reactor without removal of the nozzle growth showed that further growth of the titanium sponge did not occur which suggested the approach of an equilibrium state. In the later runs it was found unnecessary to keep the sodium line free from salt by the use of argon once the porous, protective sponge had formed.

*Example VI*

To a mild steel reactor 10 inches in diameter and 24 inches long containing 50 lbs. of sodium chloride-titanium subchloride molten salt mixture at 800° C., liquid sodium metal was introduced through a ½ inch steel pipe having a downward facing opening 3 inches above the reactor bottom while simultaneously TiCl$_4$ was added from the reactor to the vapor space above the molten pool.

To prevent plugging of the sodium inlet with either titanium metal sponge or frozen salt, argon was first passed through the sodium inlet until three minutes after the sodium flow was started. The argon was then discontinued since a titanium sponge buildup of approximately 8 inches in diameter on the nozzle prevented any danger of plugging.

Sodium was added to the reactor at a rate of 10 lbs. per hour while TiCl$_4$ was added as required to maintain the reactor pressure at 2–3 p.s.i.g. Periodic pressures in excess of 3 p.s.i.g. were relieved by venting. A total of 175 lbs. of mixed salt was produced over a 3½ hour period of operation. At the end of the run, the reactor was drained.

It was found that the 8 inch titanium sponge, which was immersed in the molten salt mixture during the run, did not change in size and remained porous. Subsequent similar runs made without removing this sponge failed to show any growth in its size.

Subsequent operations showed that the reaction rate could be speeded greatly by agitating the molten pool by means of argon added with the sodium.

Analysis of the product showed:

Ti—22.17%
Na—12.17% or about $1.15NaCl \cdot TiCl_{2.85}$
$Cl_2$—65.6%

The reducing metals applicable to this invention are the alkalinous metals lithium, sodium, potassium, rubidium, cesium, magnesium, calcium, strontium and barium and mixtures thereof. Since it is entirely feasible to regenerate these metals from the ultimate by-product salts LiCl, NaCl, $MgCl_2$ etc. the more expensive ones may be used when desired. Thus, mixtures of Na and K or Li and Na will produce salt mixtures having lower melting points with consequent relative ease of handling in the molten state. However, the cheaper, more abundant reducing metals, sodium or magnesium, are usually preferred. The reducing metal is preferably metered by positive displacement pumps and fed to the reaction chamber in the liquid state. It may, however, be introduced into the reaction zone in the fluid state, i.e., either liquid or vapor. When the reaction rate is high and the heat intense the feeding of the metal near its melting point will have the effect of cooling the inlet pipe thus preventing attack upon it by the halide vapors. Additional protective cooling preferably above the melting point of the refractory metal halide reactant may be applied to the inlet tube by jacketing and circulating air or other cooling fluids.

These alkalinous metal reducing agents are introduced into the reaction zone through the porous metal body. Similarly, the halides to be reduced are introduced into the reaction chamber and brought to the reaction zone, which is primarily on or closely adjacent to the periphery of the porous body. The halide may reach the reaction zone either directly or by solution in the salt phase. The reactive contact between the reducing metal is thus obtained directly or it is interpreted to include the more indirect reactive process wherein the reactant higher halide is dissolved in the salt. This solution in the salt may be through a chemical means such as indicated by the equation:

$TiCl_4 + 2NaCl \cdot TiCl_2 \rightarrow 2(NaCl \cdot TiCl_3)$
then  $NaCl \cdot TiCl_3 + Na \rightarrow 2NaCl \cdot TiCl_2$ These series of reduction steps take place in the salt film on the porous body when said body is suspended above the molten salt pool, and in the molten salt body when the body is immersed. The actual reaction between the reducing metal and the refractory metal halide is usually confined to the vicinity of the porous metal peripheral surface. The expression "reactive contact with a fluid halide etc." is understood to include its reduction of any of such halides supplied either directly or through the series of partial reductions shown above. The reactive contact with the lowest halides such as $MCl_2$ is limited by the controlling features of this invention and the feed ratios to only that necessary to form the desired porous body. Aside from this the production process involves only reduction of halides of valence higher than two.

Generally the higher halides of the refractory metals are the more volatile or easily vaporized. They may be introduced as vapor into the reaction chamber from suitable boilers or subliming devices. When these halides exist in the liquid state at the pressures used they may also be introduced into the reaction chamber in the liquid state. This facilitates measuring in large scale operation and also serves as a means of controlling the growth and maintaining porous the refractory metal sponge by contacting it with a high concentration of this corroding reactant. Thus the controlled directing of streams or drops of $TiCl_4$ may be utilized to control and limit the size of the porous titanium body, which carries the reaction zone at its surface, within predetermined limits. Example I illustrates one instance of such control. Another embodiment would involve streams of the chloride projected horizontally, or at other angles, onto the porous body where the recession of its contour was desired. In cases where the porous metal body is immersed in the salt product the higher refractory metal halide is introduced at least intermittently into the vicinity of said body to effect this size control. It may be done by injection into the molten salt below the body so that its vapor or solution in the salt act on the metal or it may be added to the vapor space above the salt level sometimes under suitable pressure to effect its physical or chemical solution and eventual interaction as desired with the growing porous body. Agitation of the molten salt is useful here. In this way the process is made to continue, and the growing of the refractory metal mass to an extent which fills the reaction chamber is prevented.

The maintenance of this porous metal body or sponge over and around the reducing metal inlet is a critical feature of this invention. It appears to function as a non-clogging site for the mixing and reacting of the reactants and a non-contaminating support for the reaction zone which lies within or close to its periphery. Because of its dynamic structure, i.e., its ability to alternately grow and diminish in size in response to the controllable ambient conditions, it is uniquely adapted to this process and solves the problem of plugging and choking previously encountered. These ambient conditions relate to concentration and location of reactants, the rate of feeding the reducing metal especially in terms of the amount per hour per surface unit of the porous body. The provision of a high concentration of $TiCl_4$ for example, at the surface of the sponge causes the titanium metal to be dissolved probably according to the mechanism indicated by the chemical reactions:

$TiCl_4 + TiCl_2 \rightarrow 2TiCl_3$
$2TiCl_3 + Ti \rightarrow 3TiCl_2$
$Ti + 3TiCl_4 \rightarrow 4TiCl_3$ As the sodium flow continues with the formation of the salt products these di- and tri-chlorides are dissolved therein carrying along the dissolved Ti. Several chemical equilibria are involved, however, and the over-all reaction is not simple. Generally, when the input reducing metal/higher halide mol ratio is high, e.g. approaching reduction to valence of two, the formation of new refractory metal is favored and the average valence of the partially reduced metal is low. This low valent product, such as $Na_2TiCl_4$, does not attack or corrode the metal. So, when it is desired to etch away and reduce the size of the porous body an increase in higher halide concentration is provided by either impinging the $TiCl_4$ liquid on the metal or by increasing the $TiCl_3$ concentration in the molten salt mixture in which the porous body may be immersed. This $TiCl_4$ may react directly with the metal as shown above but it also reacts with the low valent chlorotitanite; for example:

$Na_2TiCl_4 + TiCl_4 \rightarrow 2NaTiCl_4$

Depending upon the extent of this reaction, the average titanium valence of the product salt composition will increase and become more and more corrosive toward the metal which then undergoes the reaction $Ti + 2NaTiCl_4 \rightarrow Na_2Ti_3Cl_8$ $Na_2Ti_3Cl_8$ is not necessarily purported to be a true molecular specie but is more probably a mixture of $2TiCl_2 \cdot Na_2TiCl_4$ This control process, described in terms of titanium, is analogous to the process where zirconium is the metal involved. With metals of the 5th and 6th periodic groups the reactive halides include those of the maximum valence as well as those of intermediate valence above the valences of two.

Under some of the conditions of operation, the rates of formation of the refractory metal and the rate of its solution and corrosion in the salt mixtures are equal and the porous body is at a dynamic equilibrium with respect to its size. Such an equilibrium condition may have been approached in the processes described in Examples I and II and IV–VI. The particular equilibrium size is related to the various ambient conditions but this relation is complex and not thoroughly understood. Consequently, although one usually wishes to control the size within certain predetermined limits, the equilibrium size must be determined by experiment. The actual predetermined size is not highly critical, but is desirable to maintain this porous body large enough to cover the sodium inlet and it should be restricted in size so as not to contact the vessel walls to any great extent, preferably not at all. In practice, one would decide upon the desired production rate and the composition of the product, and, by experiment, develop the size of vessel required to adequately contain that particular porous body. However, this equilibrium condition is not essential to the operation of this process.

In many instances it is advantageous to change conditions and vary the porous body size during the operation for purposes of renewing the porous structure and restricting its volume and weight within practical and operable limits. In addition to reducing the porous body's size by impinging streams of $TiCl_4$, a size reduction is also obtainable by contacting the porous body with molten chlorotitanite salt mixtures containing trivalent and tetravalent titanium. The effect is of more practical magnitude when at least half the titanium present in the salt is trivalent or tetravalent although the effect varies with the temperature. In general, the porous metal body is partially dissolved by bathing it in fluid titanium halide compositions containing titanium in valence state greater than two including three and four. Not only does the porous body have to be maintained at a practical size but it must be kept porous. The deposition of metal from the reaction zone tends to close the pores requiring higher and higher pressures in the reducing metal feed line to maintain production rates. These pores are opened and renewed by the corroding action of the higher valent titanium chloride compounds. To facilitate the pore opening step the reducing metal flow may be decreased or stopped while the bathing with higher valent compounds is under way. Frequently it helps in clearing the pores to substitute a slow or intermittent flow of argon for the reducing metal as does the intermittent interruption of the flow. Various methods of bathing the porous body in these fluids containing higher valent titanium are feasible. A simple procedure is to cut down or eliminate sodium flow and let the $TiCl_4$ vapor or liquid etch the metal. However, since a carrier salt serves to prevent solid accretions of the lower titanium chlorides it is preferred to use the salt mixtures. In the apparatus shown in FIGURE 1 it is convenient to lower pipe 13 and immerse the porous body in the salt during a period of diminished sodium or argon flow. Slow $TiCl_4$ feed may be supplied to just maintain the $TiCl_4$ atmosphere above the salt pool. Similarly, the continuous immersion of the sponge in the molten salt mixture, as illustrated in FIGURE 2, and the controlled concentration of the higher valent titanium in the salt mixture is equally effective. However, in either case the relative adjustment of both feeds should be such as to give the average amount of reactants required to produce the desired product. That is, if excess $TiCl_4$ is momentarily used then a compensating excess of sodium must be supplied at an appropriate time such as just after the metal dissolving operation.

Here again, this control procedure, described in turns of titanium, is also applicable when preparing lower valent salt composition of the other refractory metal halides contemplated by this invention.

Temperature ranges associated with the process may vary. Generally, the temperature range within the reaction zone should be greater than the melting point of the reductant metal and also above the melting point of the resulting alkalinous salt-lower refractory metal halide composition but below the melting point of the porous refractory metal body. Preferably, the temperatures should range between the melting point and the boiling point of the alkalinous salt-lower refractory metal halide composition. In most cases the melting point of these compositions will be below 600° C., and the boiling point will not exceed 1400° C. The preferred or usually observed operating range is from 800° C. to 1200° C.

The preferred reducible halide reactants which are initially introduced into the reactor are the stable more volatile and higher valence halides of the refractory or high melting metals of the fourth, fifth and sixth periodic groups. Iodides, bromides and fluorides are included but for well known reasons the chlorides are preferred as being cheaper, more available and giving rise to ultimate by-product salts such as $NaCl$, $MgCl_2$, $KCl$, $CaCl_2$, which are lower melting than the corresponding fluorides and hence more easily handled. The fluorides are useful, for example, in preparing feed mixtures for the electrometallurgical winning of the refractory metal. To overcome the difficulty associated with the high melting residual salts such as $NaF$ or $CaF_2$, other salts such as $KCl$, $NaCl$ may be added in known manner to lower the melting point. More specifically the refractory metal halide reactants initially introduced are those of periodic groups IV, V, and VI which have normal boiling points below about 500° C. and are stable enough to be of practicable availability. The specific useful halides include $TiF_4$, $TiCl_4$, $TiBr_4$, $TiI_4$, $ZrCl_4$, $ZrBr_4$, $ZrI_4$, $HfCl_4$, $HfBr_4$, $HfI_4$, $VF_4$, $VCl_4$, $VBr_4$, $VF_5$, $NbF_5$, $NbCl_5$, $NbBr_5$, $NbI_5$, $TaF_5$, $TaCl_5$, $TaBr_5$, $TaI_5$, $MoCl_4$, $MoBr_4$, $MoI_4$, $MoF_5$, $MoCl_5$, $MoF_6$, $WF_5$, $WCl_5$, $WBr_5$, $WF_6$, and $WCl_6$.

The various reactant halides undergo various degrees of reduction in accordance with this process. Consequently, one controls the amount of reduction within these limits by regulation of the amount of reducing metal supplied to the reaction zone. Another factor that appears to control the degree of reduction is the reaction temperature and the temperature at which the product is removed from the reaction zone. The amount of reducing metal used usually lies in the range of that required to reduce the refractory metal in the higher halide compound to a valance ranging from two to about three. Thus the resulting titanium products are $TiCl_3$, $TiCl_2$ or mixtures in association with the by-product salt. Zirconium, hafnium and vanadium products are similar. The niobium and tantalum products involve reduced halides comprising compositions exemplified by $NBCl_2$, $NbCl_3$ or mixtures in association with the by-product salt with the analogous situation existing for molybdenum and tungsten. In the case of the last two, however, stable and useful mixed salt products may contain appreciable tetravalent compounds when reduction from the pentavalent or hexavalent state is made. Broadly then, the amount of alkalinous reducing metal used may range from that required to remove one halogen atom from each mol of refractory metal higher halide to the amount which will react with all but two of these halogen atoms. Preferably the process reduces the valence of the refractory metal of the compounds to the range of two to three inclusive.

The equipment used for the partial reduction process may be of ordinary steel or iron construction. However, high temperature corrosion resistant steels such as 304 and 316 chrome-nickel steels may be used. Pure nickel may be used where danger of corrosion by the halide vapor is high. High temperature alloy vessels lined with mild steel are especially suited for making the lower valent products. The design of the apparatus is not particularly critical although the following features should be provided for by some satisfactory means: a reaction chamber free of air and moisture in-leakage, reducing metal and metal halide inlets, outlets for the molten product, devices such as hooks, pins, or cups on the reducing metal inlet pipe to hold the porous metal body in place, heating means to prevent freezing of the fluid phases and to initiate the reaction, cooling to remove heat of reaction, temperature indicators, means for directing the metal halide reactant, and other known auxiliary devices for controlling and observing the process herein described.

The maintenance of the porous metal body over the inlet at a desirable size, i.e., not extending to the wall of the reactor, is related in part to the rate of feeding the reducing metal. If too slow a feed is employed the body will be etched away and may have to be reinstalled. At higher metal rates the porous body grows more rapidly, other conditions being constant. For continuous production of a salt product one may feed the reducing metal at a rate which holds the size at near equilibrium. Thus for making a product having an average titanium valence of about 2.6 at 800–850° C. in a 25 inch diameter reactor of the type illustrated in FIGURE 1 the sodium rate of roughly 9 lbs./hr. per square foot of gross area of the porous body results in long runs with quite stable size. For higher rates or where a lower valent product is being made the body will grow faster and more frequent resort to size control methods previously described is required. Higher feed rates may be employed with quite steady size at higher temperatures. No upper limit to rate has been found and hence it may vary widely and yet remain within the scope of this invention.

This process provides certain improvements in the preparation of partially reduced refractory metal halide compositions such as the sodium chlorotitanites described herein. One advantage lies in the possibility of high rate continuous operation due to the avoidance of plug formations in the reductant inlet. Another advantage lies in the control of the location of the reaction zone. This zone is maintained in contact only with the non-contaminating reactants and products by means of a unique structure of the refractory metal itself. Also, by control of the refractory metal sponge the high temperature of the reaction zone is kept away from the vessel walls which might fail at such temperatures.

We claim:
1. A process for the preparation of a molten salt composition containing an alkalinous halide salt of a metal selected from the group consisting of lithium, sodium, potassium, rubidium, cesium, magnesium, calcium, strontium, and barium and a subhalide of a refractory metal selected from the group consisting of titanium, zirconium, hafnium, vanadium, niobium, tantalum, molybdenum, and tungsten which comprises through an inlet into a reaction chamber introducing continuously a fluid alkalinous reducing metal selected from the group consisting of lithium, sodium, potassium, rubidium, cesium, magnesium, calcium, strontium, and barium through a porous metal body of the refractory metal being reduced maintained over and around said inlet and into reactive contact with a higher halide of said refractory metal in fluid form being separately and continuously introduced into said chamber, subjecting said porous metal body to the corrosive action of higher valent refractory metal halide to maintain it in a porous condition and limit its size, controlling the amount of said alkalinous metal introduced to a quantity sufficient to react with at least one atom of halogen per molecule of refractory metal halide being reduced up to amounts sufficient to react with all but two of the halogen atoms of said molecule, and continuously removing the molten refractory metal subhalide and said alkalinous halide salt product from the reaction zone.

2. A process for the preparation of a molten salt composition containing an alkalinous chloride of a metal selected from the group consisting of lithium, sodium, potassium, rubidium, cesium, magnesium, calcium, strontium, and barium and a subchloride of a refractory metal selected from the group consisting of titanium, zirconium, hafnium, vanadium, niobium, tantalum, molybdenum, and tungsten which comprises introducing through an inlet into a reaction chamber a fluid alkalinous reducing metal selected from the group consisting of lithium, sodium, potassium, rubidium, cesium, magnesium, calcium, strontium, and barium through a porous metal body of the refractory metal being reduced maintained over and around said inlet and into reactive contact with a higher chloride of said refractory metal in fluid form, limiting the size of said porous metal body and maintaining it in a porous condition by impinging corrosive higher valent refractory metal chloride thereon, controlling the amount of said alkalinous metal introduced to a quantity sufficient to react with at least one atom of chlorine per molecule of refractory metal chloride being reduced up to amounts sufficient to react with all but two of the chlorine atoms of said molecule, and removing the molten refractory metal subchloride and said alkalinous chloride salt product from the reaction zone.

3. The process for the preparation of a molten salt composition containing an alkalinous chloride of a metal selected from the group consisting of lithium, sodium, potassium, rubidium, cesium, magnesium, calcium, strontium, and barium and a subchloride of a refractory metal selected from the group consisting of titanium, zirconium, hafnium, vanadium, niobium, tantalum, molybdenum and tungsten which comprises through an inlet into a reaction chamber introducing continuously a fluid alkalinous reducing metal selected from the group consisting of lithium, sodium, potassium, rubidium, cesium, magnesium, calcium, strontium, and barium through a porous metal body of the refractory metal being reduced maintained over and around said inlet and into reactive contact with a fluid chloride of said refractory metal being separately and continuously introduced into said chamber, maintaining said porous metal body immersed in the molten product salt composition containing higher valent refractory metal chlorides to maintain it in a porous condition and prevent contact with the reaction vessel walls, controlling the amount of said alkalinous metal introduced to a quantity sufficient to react with at least one atom of chlorine per molecule of the refractory metal chloride being reduced up to amounts sufficient to react with all but two of the chlorine atoms of said molecule, and continuously removing the molten refractory metal subchloride and said alkalinous chloride salt product from the reaction zone.

4. The process for the preparation of a molten salt composition containing an alkalinous chloride of a metal selected from the group consisting of lithium, sodium, potassium, rubidium, cesium, magnesium, calcium, strontium, and barium and a subchloride of titanium which comprises introducing through an inlet into a reaction chamber a fluid alkalinous reducing metal selected from the group consisting of lithium, sodium, potassium, rubidium, cesium, magnesium, calcium, strontium, and barium through a porous titanium body maintained over and around said inlet and into reactive contact with fluid titanium tetrachloride, said titanium tetrachloride being at least partially vaporized, limiting the size of said porous titanium body and maintaining it in a porous condition by impinging corrosive higher valent titanium chloride thereon, controlling the amount of said alkalinous metal introduced to a quantity sufficient to react with at least one atom of chlorine per molecule of titanium chloride being reduced up to amounts sufficient to react with all but two of the chlorine atoms of said molecule, and removing the molten titanium subchloride and said alkalinous chloride salt product from the reaction zone.

5. The process for the preparation of a molten salt composition containing sodium chloride and a subchloride of titanium which comprises introducing through an inlet into a reaction chamber fluid sodium reducing metal through a porous titanium body maintained over and around said inlet and into reactive contact with fluid titanium tetrachloride, limiting the size of said porous titanium body and maintaining it in a porous condition by impinging corrosive higher valent titanium chloride thereon, controlling the amount of sodium metal introduced to a quantity sufficient to react with at least one atom of chlorine per molecule of titanium tetrachloride being reduced up to amounts sufficient to react with all but two of the chlorine atoms of said molecule, and removing the molten titanium subchloride and sodium chloride salt product from the reaction zone.

6. The process for the preparation of a molten salt composition containing sodium chloride and a subchloride of titanium which comprises through an inlet into a reaction chamber introducing continuously fluid sodium reducing metal through a porous titanium body maintained over and around said inlet and into reactive contact with fluid titanium tetrachloride being separately and continuously introduced into said chamber, intermittently bathing said porous titanium body in the product salt composition containing titanium trichloride to maintain it in a porous condition and prevent contact with the reaction vessel walls, controlling the amount of sodium metal introduced to a quantity sufficient to react with at least one atom of chlorine per molecule of titanium tetrachloride being reduced up to amounts sufficient to react with all but two of the chlorine atoms of said molecule, and continuously removing the molten titanium subchloride and sodium chloride salt product from the reaction zone.

7. The process for the preparation of a molten salt composition containing sodium chloride and a subchloride of titanium which comprises through an inlet into a reaction chamber introducing continuously fluid sodium reducing metal through a porous titanium body maintained over and around said inlet and into reactive contact with fluid higher titanium chloride being separately and continuously introduced into said chamber, maintaining said porous titanium body immersed in the molten product salt composition containing higher valent titanium chlorides to maintain it in a porous condition and prevent contact with the reactive vessel walls, controlling the amount of sodium metal introduced to a quantity sufficient to react with at least one atom of chlorine per molecule of higher titanium chloride being reduced up to amounts sufficient to react with all but two of the chlorine atoms of said molecule, and continuously removing the molten titanium subchloride and sodium chloride salt product from the reaction zone.

References Cited in the file of this patent

UNITED STATES PATENTS

| | | |
|---|---|---|
| 2,783,196 | Raney | Feb. 26, 1957 |
| 2,846,304 | Keller et al. | Aug. 5, 1958 |
| 2,847,298 | Vaughn | Aug. 12, 1958 |
| 2,847,299 | Keller et al. | Aug. 12, 1958 |
| 2,848,319 | Keller et al. | Aug. 19, 1958 |

UNITED STATES PATENT OFFICE
CERTIFICATE OF CORRECTION

Patent No. 3,075,837 January 29, 1963

Alfred R. Conklin et al.

It is hereby certified that error appears in the above numbered patent requiring correction and that the said Letters Patent should read as corrected below.

Column 11, lines 58 and 59, column 12, lines 35 and 36, column 13, lines 20 and 21, and column 14, lines 7 and 8, for "comprises through an inlet into a reaction chamber introducing continuously", each occurrence, read -- comprises continuously introducing through an inlet into a reaction chamber --; column 12, line 9, for "tatntalum" read -- tantalum --; line 34, after "molybdenum" insert a comma.

Signed and sealed this 7th day of April 1964.

(SEAL)
Attest:

ERNEST W. SWIDER
Attesting Officer

EDWARD J. BRENNER

Commissioner of Patents